(12) United States Patent
Hoffman (10) Patent No.: US 10,235,391 B2
(45) Date of Patent: Mar. 19, 2019

(54) METHOD AND APPARATUS FOR IMPLEMENTING DYNAMIC DATABASE TRAVERSAL

(71) Applicant: Change Healthcare Holdings, LLC, Nashville, TN (US)

(72) Inventor: Marion Hoffman, Amherst, MA (US)

(73) Assignee: CHANGE HEALTHCARE HOLDINGS, LLC, Nashville, TN (US)

( * ) Notice: Subject to any disclaimer, the term of this patent is extended or adjusted under 35 U.S.C. 154(b) by 812 days.

(21) Appl. No.: 13/920,625

(22) Filed: Jun. 18, 2013

(65) Prior Publication Data

US 2014/0372406 A1    Dec. 18, 2014

(51) Int. Cl.
*G06F 17/30* (2006.01)

(52) U.S. Cl.
CPC .............................. *G06F 17/30289* (2013.01)

(58) Field of Classification Search
CPC ......... G06F 17/30557; G06F 17/30321; G06F 17/30988
USPC .................................................. 707/713, 714
See application file for complete search history.

(56) References Cited

U.S. PATENT DOCUMENTS

| | | | | |
|---|---|---|---|---|
| 7,490,100 | B2* | 2/2009 | Dettinger | G06F 17/30392 |
| 8,458,164 | B2* | 6/2013 | Payton | G06F 17/30392 |
| | | | | 707/713 |
| 8,850,362 | B1* | 9/2014 | Khoshnevisan | G06F 17/30864 |
| | | | | 715/853 |
| 2002/0035559 | A1* | 3/2002 | Crowe | G06F 17/30321 |
| 2002/0174124 | A1* | 11/2002 | Haas | G06F 17/30241 |
| 2006/0010058 | A1* | 1/2006 | D'Hers | G06Q 10/10 |
| | | | | 705/35 |
| 2008/0016032 | A1* | 1/2008 | Dettinger | G06F 17/30427 |
| 2008/0301168 | A1* | 12/2008 | Adler | G06F 17/30595 |
| 2011/0196748 | A1* | 8/2011 | Caron | G06F 3/04847 |
| | | | | 705/14.72 |

* cited by examiner

*Primary Examiner* — Monica M Pyo
(74) *Attorney, Agent, or Firm* — Alston & Bird LLP (57) ABSTRACT

A method, apparatus and computer program product are therefore provided for implementing requests for data using independent data objects. In this regard, the method, apparatus and computer program may receive a request for set of data. The request may include an identifier for the particular set of data. The method may further determine a structure of the set of data using an attribute table associated with one or more data objects, and generate a query using the determined structure of the set of data. The generated query may be executed to retrieve a set of data responsive to the request. The retrieved data may be used along with the determined structure to provide a response to the request.

14 Claims, 8 Drawing Sheets

METHOD AND APPARATUS FOR IMPLEMENTING DYNAMIC DATABASE TRAVERSAL

TECHNOLOGICAL FIELD

An example embodiment of the present invention relates generally to processing of database data, and, more particularly, to implementing dynamic traversal of database tables.

BACKGROUND

As technological advances have led to increased power and sophistication of computing devices, these devices have resulted in unprecedented access to data for the ordinary user. Antiquated physical filing systems are more and more frequently being replaced with modern databases, allowing for access and correlation of data records in ways that were previously thought impossible. For example, one technological field that is currently experiencing a revolution in this regard is in the creation of electronic medical records. Where a patient's medical history was previously located in a plurality of physical files across several medical practitioners' offices, records may now be stored electronically to coordinate data in a single location accessible to practitioners, insurance companies, and other interested parties.

However, in order to modify and edit these databases, a user must typically have some background in managing and creating relational database structures. Relatively simple tasks such as adding a column to a complex relational database may require the user to have several years of experience and training in order to preserve the database structure and schema while adding the desired functionality, and incorrect implementation may have a profound impact on the tools used to access said data (e.g., report generation software). Many customers may desire to make changes to their particular database implementation, but not desire to hire and support specially trained personal to act as their database administrators.

In response to this need, applications have been developed that serve to allow users to extend and create database objects without the need to make complex modifications to the underlying database structure. However, while these virtual structures may serve to expand on some of the base database functionality, such applications lack a deep understanding of the database structure, and thus are unable to support more complicated database objects and relationships.

BRIEF SUMMARY

A method, apparatus and computer program product are therefore provided according to an example embodiment of the present invention to implement independent data objects in a database. In this regard, the method, apparatus, and computer program product of an example embodiment may function to receive a request for a particular data object derived from information stored in a database.

Embodiments may access information related to the requested data from an attribute table. The attribute table may provide information about the structure of the database relative to the requested data, such as data related to columns of the database associated with the requested data. The attribute table may further identify a path through the database structure for each set of data to be presented in response to the request. Embodiments may utilize this path information, such as by one or more queries, to access the appropriate data from data tables of the database and retrieve data from an independent object and/or other data tables. The data received as a result of the queries may be organized and presented in response to the original request. Embodiments may implement creation and access to this data by determining and storing metadata associated with the different objects of the database.

Embodiments may include a method for retrieving data from a database. The method may include receiving a request for a set of data stored in a relational database, determining a first entry in at least one attribute table associated with the set of data, and determining, using a processor, three or more attributes for the set of data using the entry. The three or more attributes may provide at least a portion of a query for obtaining the set of data. Each of the three or more attributes may identify at least one data object to be joined by the query to obtain the set of data. A first attribute of the three or more attributes may indicate a first data object, a second attribute of the three or more attributes may indicate a second data object, and a third attribute of the three or more attributes may indicate a third data object. The first data object may not be dependent upon any data objects, the second data object may reference the first data object but not depend upon the first data object, and the third data object may reference the first data object and depend upon the first data object. The method may also include generating the query using the three or more attributes and executing the query to retrieve data responsive to the request. The method may also include providing the retrieved data to a remote computer that generated the request. The attribute table may include a plurality of rows, and the first entry may be associated with at least one column of a first data table of the relational database. The first entry may correspond to a row of the attribute table. The first entry may include at least one reference to at least one additional entry within the attribute table. In some embodiments, the first entry is associated with a first column of a first data table of the relational database and the additional entry is associated with a second column different than the first column. The second column may be located within a different data table than the first data table. The query may be at least one of a join query or a select query. The method may also include providing an interface to define a data object comprising at least a portion of the set of data. Each entry within the attribute table may include data indicating a data table name and a data table column associated with each particular entry.

Embodiments may also include an apparatus. The apparatus may include at least one processor and a memory, the memory comprising instructions that, when executed by the processor, configure the apparatus. The instructions may configure the apparatus to at least receive a request for a set of data stored in a relational database, determine a first entry in at least one attribute table associated with the set of data, and determine three or more attributes for the set of data using the entry. The three or more attributes may provide at least a portion of a query for obtaining the set of data. Each of the three or more attributes may identify at least one data object to be joined by the query to obtain the set of data. A first attribute of the three or more attributes may indicate a first data object, a second attribute of the three or more attributes may indicate a second data object, and a third attribute of the three or more attributes may indicate a third data object. The first data object may not be dependent upon any data objects, the second data object may reference the first data object but not depend upon the first data object, and the third data object may reference the first data object and depend upon the first data object. The apparatus may also be configured to generate the query using the three or more attributes, and execute the query to retrieve data responsive to the request. The apparatus may be further configured to provide the retrieved data to a remote computer that generated the request. The attribute table may include a plurality of rows, and the first entry may be associated with at least one column of a first data table of the relational database. The first entry may correspond to a row of the attribute table. The first entry may include at least one reference to at least one additional entry within the attribute table. The first entry may be associated with a first column of a first data table of the relational database and the additional entry may be associated with a second column different than the first column. The second column may be located within a different data table than the first data table. The query may be at least one of a join query or a select query. The apparatus may be further configured to provide an interface to define a data object comprising at least a portion of the set of data.

Embodiments may also provide a non-transitory computer readable storage medium. The non-transitory computer readable storage medium may include instructions that, when executed by a processor, cause the processor to configure an apparatus. The instructions may cause the processor to configure the apparatus to receive a request for a set of data stored in a relational database, to determine a first entry in at least one attribute table associated with the set of data, and to determine two or more attributes for the set of data using the entry. The three or more attributes may provide at least a portion of a query for obtaining the set of data. Each of the three or more attributes may identify at least one data object to be joined by the query to obtain the set of data. A first attribute of the three or more attributes may indicate a first data object, a second attribute of the three or more attributes may indicate a second data object, and a third attribute of the three or more attributes may indicate a third data object. The first data object may not be dependent upon any data objects, the second data object may reference the first data object but not depend upon the first data object, and the third data object may reference the first data object and depend upon the first data object. The instructions may further cause the apparatus to generate the query using the three or more attributes, and to execute the query to retrieve data responsive to the request.

BRIEF DESCRIPTION OF THE DRAWINGS

Having thus described certain embodiments of the invention in general terms, reference will now be made to the accompanying drawings, which are not necessarily drawn to scale, and wherein:

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

A method, apparatus and computer program product are provided in accordance with an example embodiment of the present invention in order to provide for implementation of dynamic database traversal. In this regard, a method, apparatus and computer program product of an example embodiment may provide access to data by using metadata associated with a set of data objects. The metadata may be processed to determine a path for traversing the database structure based on which data is requested.

The term "data object" is generally used to refer to database structures, such as data tables. Data objects may be manually, explicitly, and/or particularly defined by users of the database. For example, a data object may comprise an extension to a data table (e.g., by adding an additional column containing data indexed by a common key value with the original data table, such that the extension is a child object of the data table). As another example, a data object may include an independent table containing a separate key value, and the independent table may link to various other data tables stored in the database (e.g., the independent table may not be a child object of any data tables). Embodiments of the invention provide for additional types of data objects, allowing for the user to extend the relationships between sets of data in novel ways.

For the purposes of this application, the terms "independent" and "dependent" should be understood to relate to relationships between data objects, such as data tables, including but not limited to parent-child and foreign key pointer relationships between data objects. For example, in describing two tables with a parent-child relationship, the child table should be understood to be "dependent" upon the parent table. The term "independent object" should be understood to refer to data objects which do not depend upon other tables, but which may be joined to and by other data objects.

As a particular example of different types of data objects, consider an implementation of a system for matching member insurance records with particular medical visits and the dates of those visits. A member data table might define the characteristics of each member, with a unique identifier for a member identifier, a member date of birth, member contact information, and the like. For this member data table, the member identifier might be a unique value that also functions as a key for the table. An example data object representing an extension of the member table might be a member-month object, representing a column that indicates whether the member has paid a premium for the particular month. This member-month object may be implemented as a separate table, including a foreign key pointer to a parent object (e.g., the member data table). The member-month object may thus be a child of the member object, as the member-month object would be keyed to a particular member to determine if the member has paid for the particular month. As another example, an encounter table may include data on specific patient visits (e.g., encounters). This encounter table may include an extension (e.g., another table linked to the encounter table, and including one or more columns for data associated with key values of the encounter table), which provides a reference to the encounter's membership and therefore its member data. By virtue of this reference, an encounter data table extension may provide information about particular member visits with medical practitioners. The encounter data table may be indexed by a unique reference number for each encounter (e.g., a unique id for each patient visit), as a single member might have multiple encounters with medical practitioners. The encounter table might further include a date of each encounter. In these examples, individual data tables may be data objects. However, the term "data object" may also be understood to include additional information about these data tables used for providing this data in response to a request. For example, a data object may be understood to also include various data and metadata stored external to a particular data table, such as data relating to the particular data table but stored within an attribute table.

The term "reference" as used herein is generally used to describe an address or location of a particular row of data or meta-data within a database system. As such, references may point to any row of data within an object that is within the database system. For example, references may include floating point or integer numbers that correspond to objects within the database. For example, a reference may be a "foreign key pointer" as commonly known in the field of relational databases.

Figure 1:
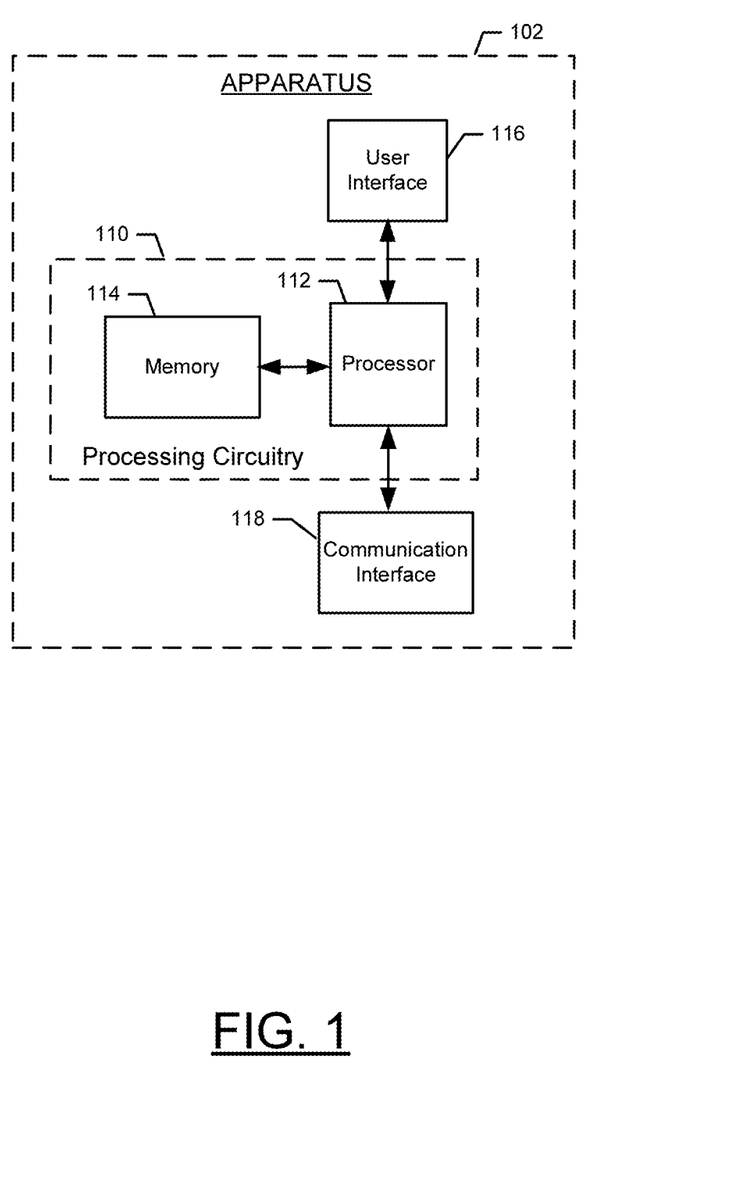
FIG. 1 is a block diagram of an apparatus that may be specifically configured in accordance with some example embodiments of the present invention.

FIG. 1 illustrates a block diagram of an apparatus 102 in accordance with some example embodiments. The apparatus 102 may be any computing device or devices configured to enable access to, or control or administration of, a database. For example, the apparatus 102 may function as a single node in a computer network that enables access to one or more data tables of the database. The apparatus 102 may include administrative functionality, allowing a user to access, add, edit, modify, and delete forms, tables, data, and any other information stored in the database, along with the ability to add to or manipulate the structure of the database. For example, the apparatus 102 may provide a user interface allowing users to define one or more data objects for use with the database. Accordingly, it will be appreciated that the apparatus 102 may comprise an apparatus configured to implement and/or otherwise support implementation of various example embodiments described herein.

It should be noted that the components, devices or elements illustrated in and described with respect to FIG. 1 below may not be mandatory and thus some may be omitted in certain embodiments. Additionally, some embodiments may include further or different components, devices or elements beyond those illustrated in and described with respect to FIG. 1.

The apparatus 102 may include or otherwise be in communication with processing circuitry 110 that is configurable to perform actions in accordance with one or more example embodiments disclosed herein. In this regard, the processing circuitry 110 may be configured to perform and/or control performance of one or more functionalities of the apparatus 102 (e.g., functionalities of a computing device on which the apparatus 102 may be implemented) in accordance with various example embodiments, and thus may provide means for performing functionalities of the apparatus 102 (e.g., functionalities of a computing device on which the apparatus 102 may be implemented) in accordance with various example embodiments. The processing circuitry 110 may be configured to perform data processing, application execution and/or other processing and management services according to one or more example embodiments. In some embodiments, the apparatus 102 or a portion(s) or component(s) thereof, such as the processing circuitry 110, may be embodied as or comprise a chip or chip set. In other words, the apparatus 102 or the processing circuitry 110 may comprise one or more physical packages (e.g., chips) including materials, components and/or wires on a structural assembly (e.g., a baseboard). The apparatus 102 or the processing circuitry 110 may therefore, in some cases, be configured to implement an embodiment of the invention on a single chip or as a single "system on a chip." As such, in some cases, a chip or chipset may constitute means for performing one or more operations for providing the functionalities described herein.

In some example embodiments, the processing circuitry 110 may include a processor 112 and, in some embodiments, such as that illustrated in FIG. 1, may further include memory 114. The processing circuitry 110 may be in communication with or otherwise control a user interface 116 and/or a communication interface 118. As such, the processing circuitry 110 may be embodied as a circuit chip (e.g., an integrated circuit chip) configured (e.g., with hardware, software or a combination of hardware and software) to perform operations described herein.

The processor 112 may be embodied in a number of different ways. For example, the processor 112 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor 112 may comprise a plurality of processors. The plurality of processors may be in operative communication with each other and may be collectively configured to perform one or more functionalities of the apparatus 102 as described herein. The plurality of processors may be embodied on a single computing device or distributed across a plurality of computing devices collectively configured to function as the apparatus 102. In some example embodiments, the processor 112 may be configured to execute instructions stored in the memory 114 or otherwise accessible to the processor 112. As such, whether configured by hardware or by a combination of hardware and software, the processor 112 may represent an entity (e.g., physically embodied in circuitry—in the form of processing circuitry 110) capable of performing operations according to embodiments of the present invention while configured accordingly. Thus, for example, when the processor 112 is embodied as an ASIC, FPGA or the like, the processor 112 may be specifically configured hardware for conducting the operations described herein. Alternatively, as another example, when the processor 112 is embodied as an executor of software instructions, the instructions may specifically configure the processor 112 to perform one or more operations described herein.

In some example embodiments, the memory 114 may include one or more non-transitory memory devices such as, for example, volatile and/or non-volatile memory that may be either fixed or removable. In this regard, the memory 114 may comprise a non-transitory computer-readable storage medium. It will be appreciated that while the memory 114 is illustrated as a single memory, the memory 114 may comprise a plurality of memories. The plurality of memories may be embodied on a single computing device or may be distributed across a plurality of computing devices collectively configured to function as the apparatus 102. The memory 114 may be configured to store information, data, applications, instructions and/or the like for enabling the apparatus 102 to carry out various functions in accordance with one or more example embodiments. For example, the memory 114 may be configured to buffer input data for processing by the processor 112. Additionally or alternatively, the memory 114 may be configured to store instructions for execution by the processor 112. As yet another alternative, the memory 114 may include one or more databases that may store a variety of files, contents or data sets. Among the contents of the memory 114, applications may be stored for execution by the processor 112 in order to carry out the functionality associated with each respective application. In some cases, the memory 114 may be in communication with one or more of the processor 112, user interface 116, or communication interface 118 via a bus or buses for passing information among components of the apparatus 102.

The user interface 116 may be in communication with the processing circuitry 110 to receive an indication of a user input at the user interface 116 and/or to provide an audible, visual, mechanical or other output to the user. As such, the user interface 116 may include, for example, a keyboard, a mouse, a joystick, a display, a touch screen display, a microphone, a speaker, a Light Emitting Diode (LED), a lighting device, an electronic sensor for capturing human body movements, and/or other input/output mechanisms. In embodiments in which the apparatus 102 is implemented on a server, aspects of the user interface 116 may be limited, or the user interface 116 may even be eliminated.

The communication interface 118 may include one or more interface mechanisms for enabling communication with other devices and/or networks. In some cases, the communication interface 118 may be any means such as a device or circuitry embodied in either hardware, or a combination of hardware and software that is configured to receive and/or transmit data from/to a network and/or any other device or module in communication with the processing circuitry 110. By way of example, the communication interface 118 may be configured to enable the apparatus 102 to communicate with another computing device via a wireless network, such as a wireless local area network (WLAN), cellular network, and/or the like. Additionally or alternatively, the communication interface 118 may be configured to enable the apparatus 102 to communicate with another computing device via a wireline network. In some example embodiments, the communication interface 118 may be configured to enable communication between the apparatus 102 and one or more further computing devices via the internet. Accordingly, the communication interface 118 may, for example, include an antenna (or multiple antennas) and supporting hardware and/or software for enabling communications with a wireless communication network (e.g., a wireless local area network, cellular network, and/or the like) and/or a communication modem or other hardware/software for supporting communication via cable, digital subscriber line (DSL), universal serial bus (USB), Ethernet or other methods.

Having now described an apparatus configured to implement and/or support implementation of various example embodiments, features of several example embodiments will now be described. It will be appreciated that the following features are non-limiting examples of features provided by some example embodiments. Further, it will be appreciated that embodiments are contemplated within the scope of disclosure that implement various subsets or combinations of the features further described herein. Accordingly, it will be appreciated that some example embodiments may omit one or more of the following features and/or implement variations of one or more of the following features.

Figure 2:
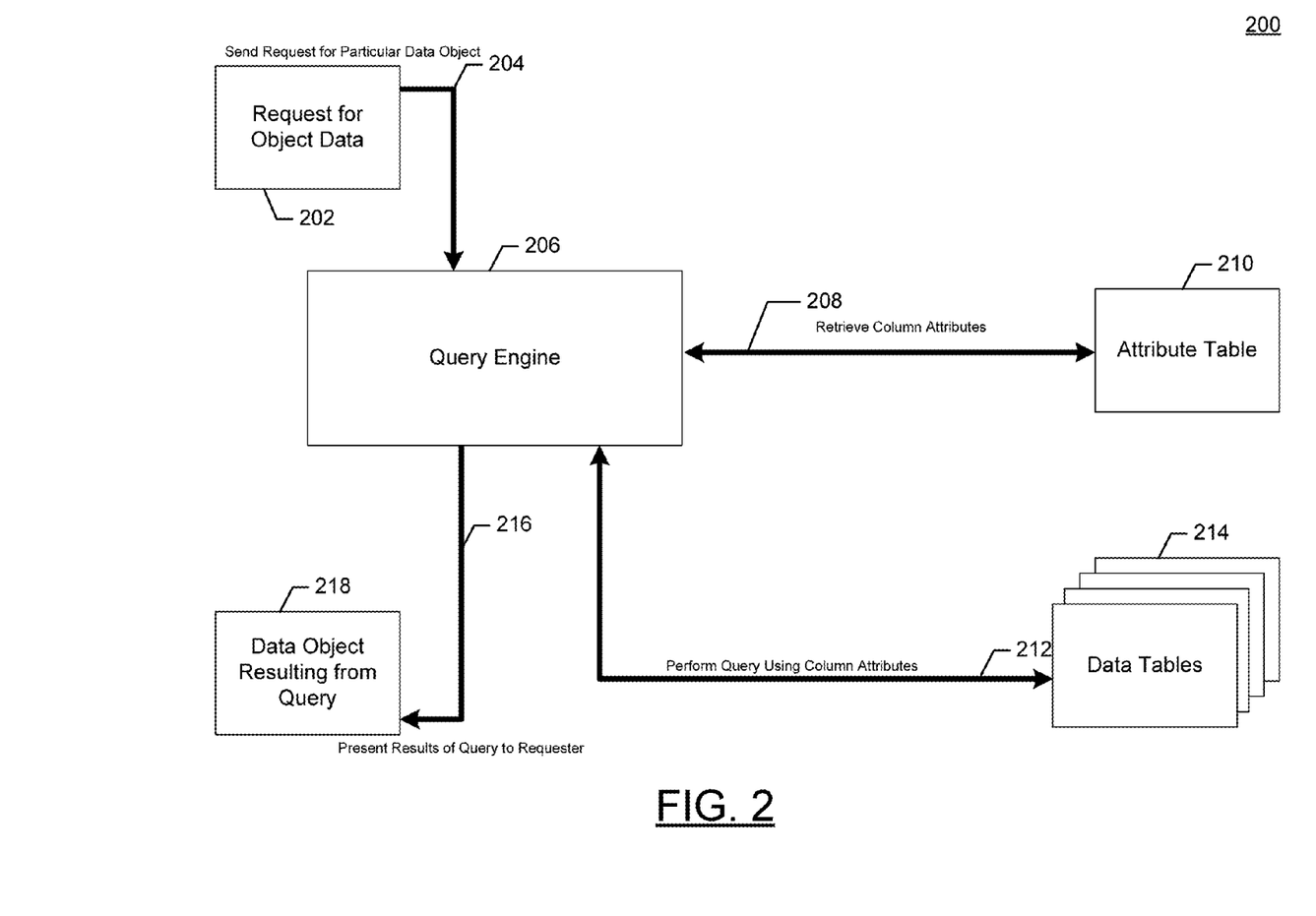
FIG. 2 is a block diagram of a data flow for accessing data in accordance with some example embodiments of the present invention.

FIG. 2 is a block diagram of a data flow for accessing data stored in one or more data objects in accordance with some example embodiments of the present invention. As described above, example embodiments of the invention allow for creation of data objects that include extensions or references to other data objects within the database. These data objects may be generated by the user without any particular knowledge of advanced database techniques, advantageously providing a flexible, transparent, and straightforward way to access, view, and manipulate data within the database without the dangers or complexities associated with modification of the underlying database structure. In this manner, the user may be presented with a user-friendly, straightforward method for establishing a flexible database schema without the need to directly interact with the database structure. The data flow 200 depicts the flow of information among various objects, structures, and elements of the system during processing of a request for information related to a data object. The data flow depicted with respect to FIG. 2 may be implemented on one or more computing devices, such as the apparatus 102 described above with respect to FIG. 1. Example interfaces for implementing the data flow 200 are illustrated below with respect to FIGS. 4 and 5.

The data flow begins at action 204 where a request 202 is sent to a query engine 206. The request 202 may pertain to data associated with a particular data object that has previously been defined for use in the data flow 200. For example, a user may request a set of data from a previously defined data object, where the previously defined data object incorporates data from several tables of the database. The data object may be defined in an interface provided by the query engine 206 or by another application layer, such as described below with respect to FIGS. 3-5. For example, a user may designate a particular data object as containing certain columns, fields of data, key values, and the like, within an interface.

The request may be received from a client application, where the client application operates to enable a user or user computer to interact with a database system. For example, the data flow 200 may include a plurality of client applications in communication with a database server for providing access to the data stored in one or more data tables. An example of an interface for requesting data is described further below with respect to FIG. 4.

The query engine 206 may function as an application layer to interpret requests, such as the request 202, and to handle the underlying database mechanics that result in the data object being provided to the computer node that originated the request 202. In this manner, the query engine 206 may function as an intermediary to shield the requester from having to interact directly with the underlying database structure.

In response to the request 202, the query engine 206 may access an attribute table to process the request 202 at action 208. The request 202 may include a request to access data associated with a particular field of a data object. For example, the request may include a particular column of a data object, or a particular value of the particular column. Upon receiving the request, the query engine 206 may access the attribute table to begin the process of identifying the path through the database necessary to obtain the information associated with the particular field. In some embodiments, the requested field may also be associated with multiple possible paths through the tables of the database. For example, a "Status Code", indicating whether a member's premium has been paid for a particular month may be accessed by traversing the database with respect to a particular encounter (e.g., requesting data associated with the encounter which points to a particular member, which points to the member's premium status), or with respect to a particular member month (e.g., requesting data associated with a particular member, which points to the member's premium status for each month). The same column of the database (e.g., the "Status Code" field) may be associated with multiple entries within the attribute table 210 corresponding to different relationship to other structures within the database, as determining the "Status Code" for a particular encounter may require a different traversal of the database than determining a "Status Code" for a particular member's monthly premium.

The attribute table 210 for the data object may include data that defines the structure of the data object and its relationship to other objects in the database. For example, the attribute table 210 may include data describing the columns for each data object implemented within the database. For example, upon creation of each data object, a corresponding entry may be created within the attribute table for the data object, describing the name of each column, the data type of the column, and any references needed to determine the value of the data included in the data object. This data may be created within the attribute table by a process known as "reflection", whereby data is entered into the attribute table or the attribute table is modified every time a data object definition is added, deleted, or modified.

Figure 3A:
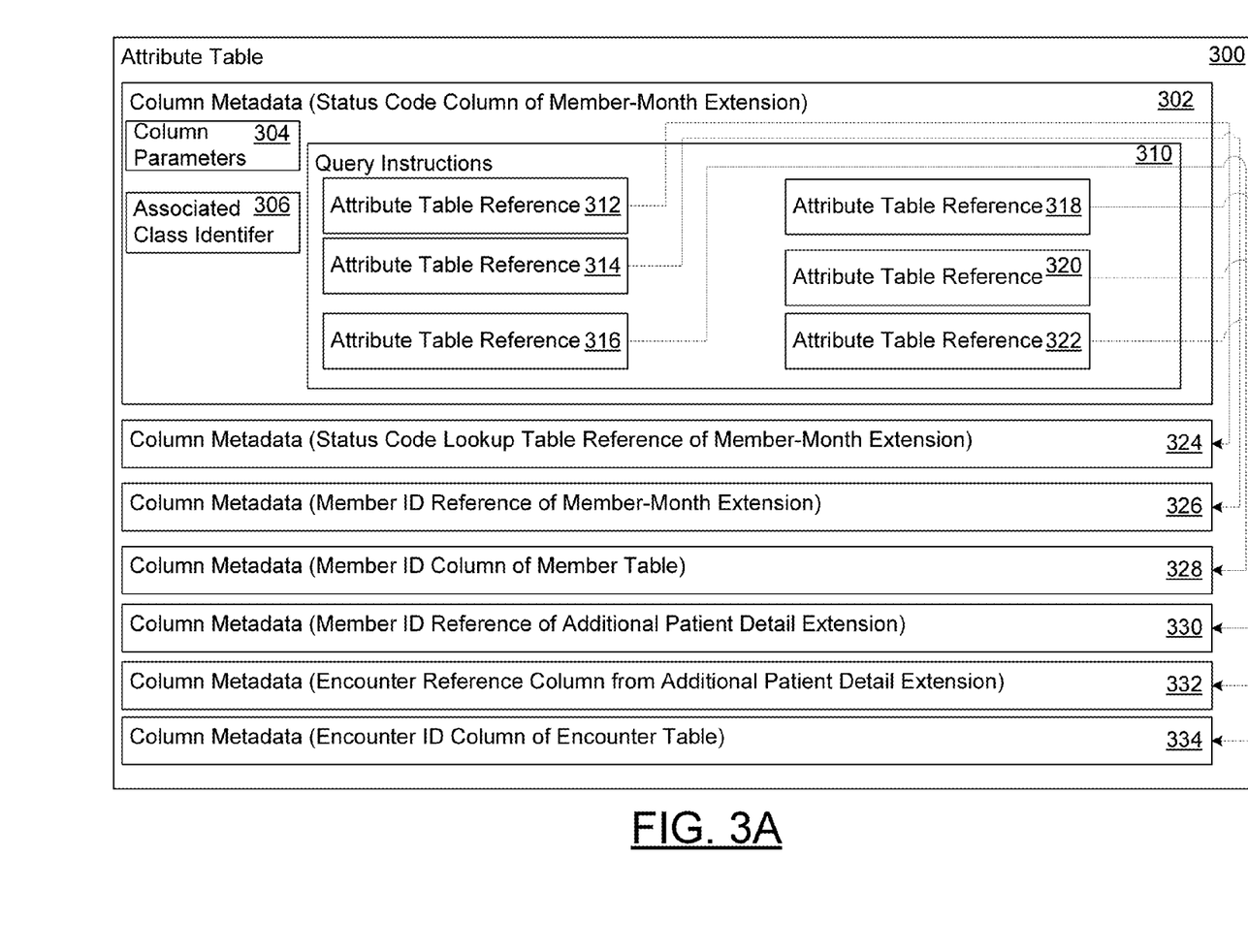
FIG. 3A is a block diagram depicting an attribute table in accordance with some example embodiments of the present invention.
Figure 3B:
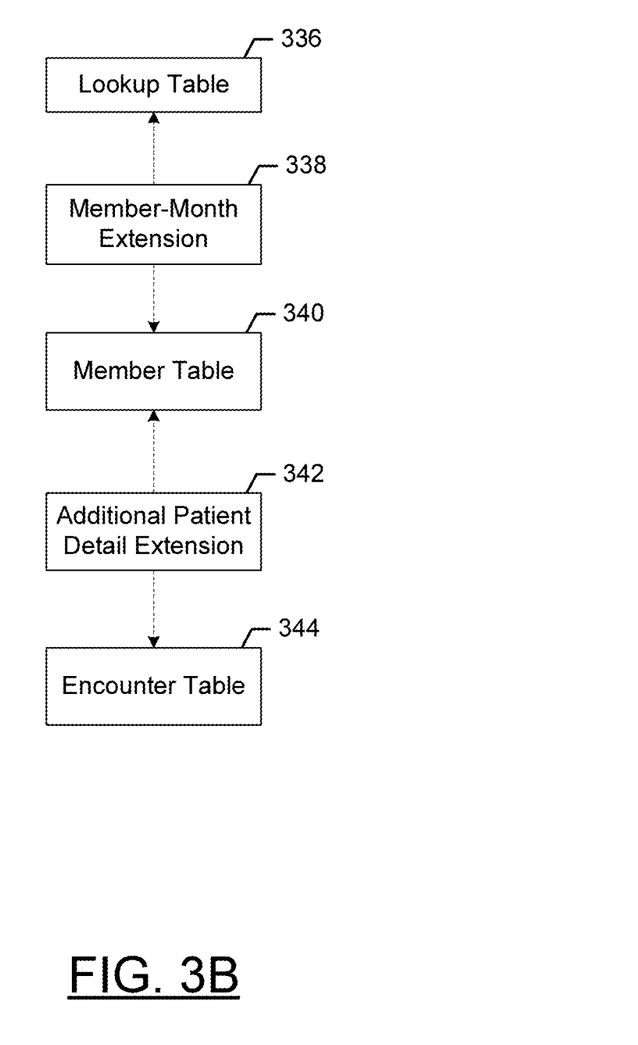
FIG. 3B is a block diagram depicting references between tables as stored in an attribute table in accordance with some example embodiments of the present invention.

As described above, the attribute table 210 may include a row for each column of each data object associated with a database system. Upon receiving a request for the particular column, the query engine may access the attribute table to identify a path through the database to provide data for the requested field. For example, a request for a data field that requires traversal of three data tables may include columns in the attribute table that each include references to the three data tables (and the associated column of each) in the attribute table row associated with the data field. These columns in the attribute table may include references to code that, when executed by the query engine, causes the query engine to obtain the data associated with the particular requested column. For example, if a given requested column relates to a "Status Code" for a monthly premium of a member associated with a particular encounter, the row of the attribute table may include references to a lookup table (e.g., the "Status Code" value), to a member-month extension object (e.g., the member's premium for that particular month), to a member object, to additional patient detail object (e.g., an extension object of a particular encounter), and finally to an encounter table. The order and content of these references may specify how the database structure should be traversed to identify the data table relationships to populate the "Status Code" with correct data. Examples of a structure for implementing an attribute table and references within the attribute table are described further below with respect to FIG. 3.

The attributes retrieved from the attribute table at action 208 may be used to generate and execute a query at action 212. For example, the attributes may be used to create a Structured Query Language (SQL) "select" or "join" query that joins columns from different data tables 214 implemented by the system. The SQL query may function to determine the data that to be provided in response to the request. At action 216, the results of the query are provided to the original requester, such as a data table or spreadsheet resulting from a query. In some embodiments, a particular application is provided to receive the results of the query. For example, a client application may execute on a user device to initiate the request, allowing the user to specify particular columns and/or values for the request, and to display the results of the request upon completion of the query generated and executed by the query engine.

FIG. 3A is a block diagram depicting an attribute table 300, and FIG. 3B is a block diagram depicting the relationship between database objects 336-344 as described within the attribute table 300. The attribute table 300 may include attribute data for columns of the data objects 336-344, similar to the data table 214 described above with respect to FIG. 2. The data objects 336-344 may include data stored within and accessible by a database system, such as the data tables 214 described above with respect to FIG. 2.

The attribute table 300 may include data describing the structure of other tables within the database. For example, rows within the attribute table 300 may describe columns of other tables within the database, such as the data tables 336-344. In some embodiments, each column of the data objects 336-344 may have a corresponding row or rows within the attribute table 300, and each row of the attribute table may include column metadata for a particular column in the database. The attribute table 300 may be implemented as one or more sets of column metadata 302, 324-334 (e.g., a separate row for each field that may be included in a data request).

The sets of column metadata 302, 324-334 may each include data describing the structure and content of a particular column of one of the data tables 336-344. These sets of column metadata may include both a location within the database of the data to populate the field (e.g., a reference to a particular table and a particular column), and a set of data that may be used to derive the contents of the column referenced by the particular set of column metadata (e.g., instructions to build a query that returns the values associated with the field in reference to a particular column of the database). For example, the set of column metadata 302 may be a particular row within the attribute table 300, and entries within the particular row (e.g., attribute table references 312-322) may identify other rows within the attribute table that contain data that may be used to perform a query.

The set of column metadata 302 may include column parameters 304, one or more associated class identifiers 306, and query instructions 310. The class identifier 306 may provide an identifier for a particular object class associated with the set of column metadata 302. For example, the attribute table 300 may include multiple references for the same column of a data object, and the class identifier 306 may provide for a value used to disambiguate between references to the same column of the database. For example, as described above, a "Status Code" field may be related to both an encounter (e.g., via traversing from the particular encounter to additional patient detail about the encounter to a particular member to a member-month associated with the member as described above with respect to FIG. 2), and to a member object (e.g., via the member to member-month extension path described above with respect to FIG. 2). As such, depending upon the desired parent object, different paths through the database may be appropriate. In such circumstances, multiple entries within the attribute table 300 may be appropriate to reflect the different paths through the database necessary to arrive at the appropriate results that are responsive to the request for data.

The column parameters 304 may specify the data type of the column to which the set of column metadata refers, whether the column is a key value, the name of the column, whether the column is associated with a lookup table, or the like. The column parameters 304 may also include a table reference and a column identifier for location within the database of the data associated with the column described by the particular set of column metadata. In the present example, the set of column metadata 302 is associated with a status code column of a member-month table extension (e.g., whether the member has paid for the particular month or not) as it relates to a particular encounter, so the column parameters might point to the data table and column storing the status code column within the member-month data table extension. However, information describing the resulting data may be insufficient to provide a response to a user query. For example, knowing the possible output values of the status code column (e.g., paid or not paid) may not provide meaningful data about the particular member-month until the status code is joined with the particular member-month, the particular member, and the particular encounter.

As such, the set of column metadata 302 may further include one or more attribute table references 312-322 to other attributes within the query instructions 310 to assist with joining together the data tables in such a way as to provide meaningful data. These query instructions 310 may provide references to other sets of column metadata 324-334 (e.g., other rows of the attribute table) from which information may be obtained to be used in a query which returns results responsive to the original user request. Each set of column metadata 324-334 may be accessed to obtain the appropriate database location and any foreign key pointer associated with the columns and tables names needed to be accessed during the query. As can be discerned from FIGS. 3A and 3B, in the instant example the attribute table reference 312 points to a set of column metadata 324 for status code foreign key pointer of a member-month extension 338. The attribute table reference 314 points to a set of column metadata 326 for a member ID foreign key pointer of a member-month extension 338. The attribute table reference 316 points to a set of column metadata 328 for a member identifier column of a member table 340. The attribute table reference 318 points to a set of column metadata 330 for a foreign key pointer of an additional patient detail extension 342 that points to the member table 340. The attribute table reference 320 points to a set of column metadata 332 for a foreign key pointer of the additional patient detail extension 342 that points to an encounter table 344. The attribute table reference 322 points to a set of column metadata 334 for an encounter ID column of the encounter table 344.

In the present example, the member-month extension 338 may function as an extension of the member table 340, representing the linking of additional data to a particular member (e.g., their monthly premiums). The member table 340 may function as an independent object which has no parent, but which can be pointed to by other objects, such as the member-month extension 338 and the additional patient detail extension 342. The additional patient detail extension 342 may be an extension of the encounter table 344, adding additional data to the encounter (e.g., the identity of the particular member).

In some embodiments, the structure and content of the query created by the query instructions is related to the order in which the attribute table references 312-322 are presented. For example, SQL queries have a particular syntax, and the data table references may be provided in a proper order to preserve that syntax given the particular parent/child relationships within the database schema. This order and the contents of the query instructions 310 may be established at the time the data object is defined, and the query instructions 310 may be modified as the structure and contents of the database are changed. In this manner, the attribute table 300 may function as a set of metadata that describes the database schema, and may be used to traverse the database and dynamically build queries to provide users with requested data objects.

The contents of the attribute table references 312-322 may be provided as "limits." These limits may be used to identify particular rows within the attribute table which may be used to determine the path by which the database is traversed to populate the requested data object. The limits may include a unique identifier for a row of the attribute table associated with table and column values for constructing a query to provide the requested information. The row referenced by each limit may provide the name of a table and column of the table that is used by a query engine to construct an "SELECT" SQL statement. However if the data relationship is through more than one table, the limits may provide a mechanism for joining across multiple tables.

For example, a request may include data from a user defined lookup table that is referenced by an independent object. Such a data request may involve retrieving a limit that defines the relationship between the independent object and the user-defined lookup. The longer (more tables) the path through the database hierarchy, the more limits may be required. The following is an example of limits employed for traversing the database as described with respect to the attribute table references 312-322 described above.

The example begins with a reference value (e.g., a row in the attribute table) for a particular data field. This reference value may be included or otherwise associated with the data request (e.g., a client application may transmit the reference, or an interpreter application may identify the particular field for which data is sought based on an identifier transmitted in the request). A reference attribute associated with the "Status Code" field may be the value "7009527413.1". This value may be a reference to another row of the attribute table, and the other row may include a series of limits. For example, upon executing a select query for a series of attributes upon the database location 7009527413.1, a set of additional database references may be returned. For example, a query such as:

"Select limit_attrib1_id, limit_attrib2_id, limit_attrib3_id, limit_attrib4_id, limit_attrib5_id, limit_attrib6_id from attribute where unique_id=7009527413.1; (e.g., the value 7009527413.1 may be the unique identifier for the attribute meta-data for the attribute "Status Code")

may return a series of values
LIMIT_ATTRIB1  LIMIT_ATTRIB2  LIMIT_ATTRIB3
LIMIT_ATTRIB4 LIMIT_ATTRIB5 LIMIT_ATTRIB6

7009527188.1    6998549345.1    6998549222.1
6998549406.1 6998549403.1 6100074611
where each LIMIT_ATTRIB value specifies a different set of column metadata 302, 324-334 to be accessed to facilitate creation of a query that returns the "Status Code" field. These references may pertain to different rows of the attribute table that store data necessary to construct a query for returning the requested data to the user. To utilize these limits, each attribute may be the subject of a SELECT query performed on the value of the attribute.

For example, the limits shown above may return the following results:
Select db_table, attribute_cd from attribute where unique_id=7009527188.1;
may return
DB_TABLE ATTRIBUTE_CD
ed_6998549213 ed_7009509454_id /*Member-Month Extension Table—reference to Status Code Lookup*/
Where ed_6998549213 and ed_7009509454 id are values stored in the row of the attribute table known to the database system as stored at location 7009527188.1, representing the member-month extension table and a reference to the status code lookup column of the member-month extension, respectively.
Select db_table, attribute_cd from attribute where unique_id=6998549345.1;
may return
DB_TABLE ATTRIBUTE_CD
ed_6998549213 ed_6998549207_id /**Member-Month Extension Table—reference to its parent, Member Table*/
Where ed_6998549213 and ed_6998549207_id are values stored in the row of the attribute table known to the database system as stored at location 6998549345.1, representing the member-month extension table and a column of the member-month extension table containing a foreign key pointer to the member table, respectively.
Select db_table, attribute_cd from attribute where unique_id=6998549222.1;
may return
DB_TABLE ATTRIBUTE_CD
ed_6998549207 unique_id /*Member Table and its unique identifiers for each member*/
Where ed_6998549207 and unique_id are values stored in the row of the attribute table known to the database system as stored at location 6998549222.1, representing the member table and a column of the member table storing the unique member identifier, respectively.
Select db_table, attribute_cd from attribute where unique_id=6998549406.1;
may return
DB_TABLE ATTRIBUTE_CD
ed_6998549319 ed_6998549207_id /*Additional Patient Detail table and its reference to the Member Table*/Where ed_6998549319 and ed_6998549207_id are values stored in the row of the attribute table known to the database system as stored at location 6998549406.1, representing the additional patient detail table and a column of the additional patient detail containing a foreign key pointer to the member table, respectively.
Select db_table, attribute_cd from attribute where unique_id=6998549403.1;
may return
DB_TABLE ATTRIBUTE_CD
ed_6998549319 encounter_id/**Additional Patient Detail Table and its reference to its parent table, the Encounter Table*/
Where ed_6998549319 and encounter_id are values stored in the row known to the database system as stored at location 6998549403.1, representing the additional patient detail table and a column of the additional patient detail containing an identifier for the encounter, respectively.
and
Select db_table, attribute_cd from attribute where unique_id=6100074611
may return
DB_TABLE ATTRIBUTE_CD
encounter unique_id /*Encounter table and the name of its unique identifier for each encounter*/
Where encounter and unique_id are values stored in the row known to the database system as stored at location 6100074611, representing the encounter table and a column of the encounter table with a unique identifier for the particular encounter, respectively.

Upon receiving the results of the queries performed on the attribute values (e.g., extracting the DB_TABLE and ATTRIBUTE_CD values from the appropriate rows of the attribute table), the query engine may form the results of the queries (e.g., the references to particular data tables, parent data tables, and/or columns), into a new query. For example, the results of queries performed on the attributes described above may result in the following dynamically created query:
SELECT
t4.code /*Status Code from User-Defined Lookup*/
FROM encounter t0, /**Encounter Table*/
ed_6998549319 t1, /*Additional Patient Detail Extension Table*/
ed_6998549207 t2, /*Member Table */
ed_6998549213 t3, /*Member-Month Extension Table*/
ed_7009509454 t4 /*Status Code User-Defined Lookup (UDL)*/
WHERE t3.ed_7009509454_id=t4.unique_id /*Join User-Defined Lookup to Member-Month Extension Table*/
AND t3.ed_6998549207_id=t2.unique_id /*Join Member-Month Extension Table to its parent, Member*/
AND t1.ed_6998549207_id=t2.unique_id /*Join from Additional Patient Detail Extension Table to Member table*/
AND    t1.encounter_id=t0.unique_id    ORDER    BY t0.unique_id /*Join from Additional Patient Detail Extension Table to its parent, Encounter Table*/

Each table and column may be used in the construction of the SQL query above to obtain back the value of the "Status Code" field for the user-defined lookup referenced by the member table extension whose parent is an independent object (the member table), which is in turn referenced by the additional patient detail extension which extends information on the encounter table.

Figure 4:
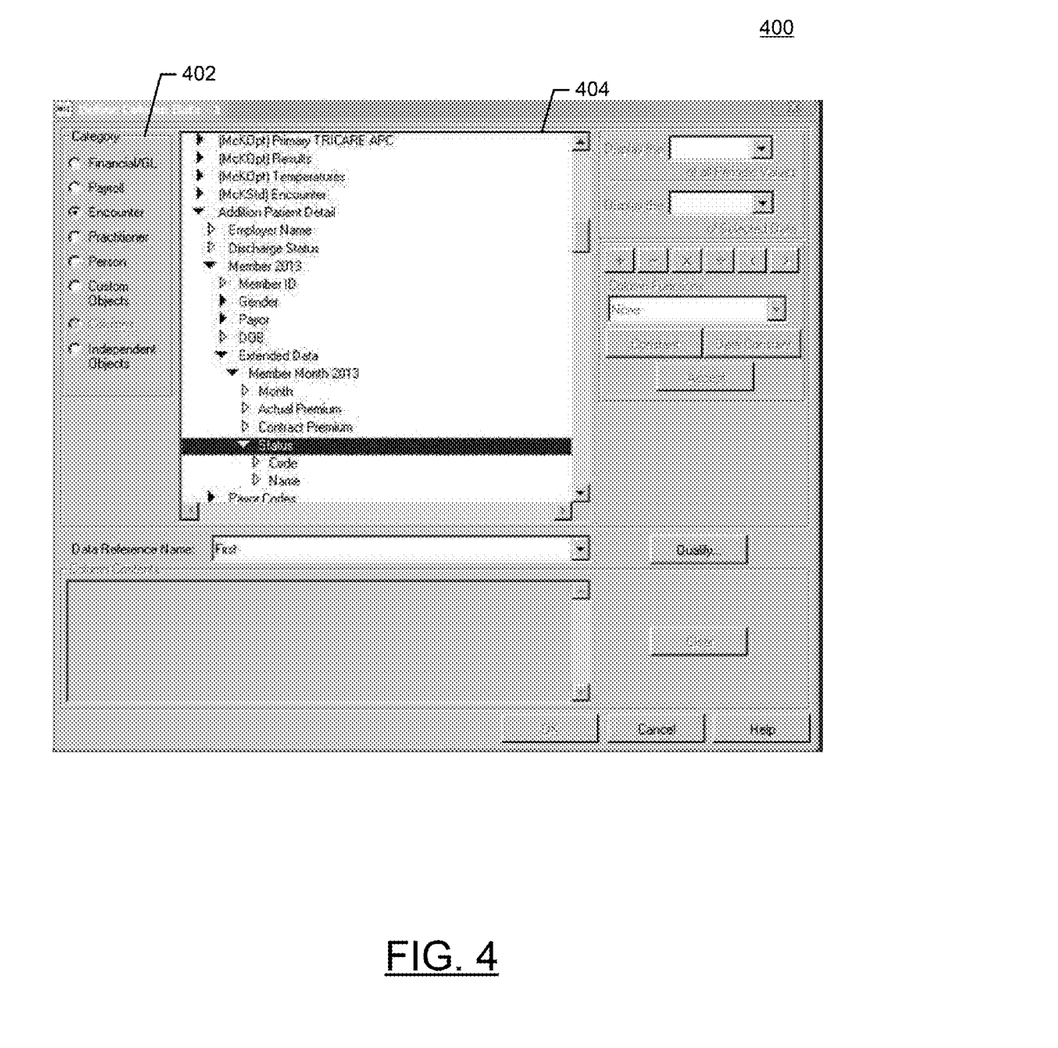
FIG. 4 is an illustration of an example of an interface for accessing data in accordance with some example embodiments of the present invention.

FIG. 4 is an illustration of an example of an interface 400 for requesting data in accordance with some example embodiments of the present invention. The interface 400 may provide an interface to a client application for interfacing with a database system. For example, the interface 400 may allow a user to interact with a client application executing on a computer to allow the user to access information stored within the database system. The interface 400 may include a "category" menu 402 allowing the user to select a particular perspective for viewing the contents of the database. In the present example, the user has selected the "encounter" category, which depicts the database from the perspective of a particular doctor-patient encounter. Selection of the category may alter a hierarchical display of the data stored within the database. As such, the interface 400 may include a hierarchy interface 404 for selecting of data fields associated with the selected category. As can be seen in the present example, the hierarchy interface 404 may display both data tables and objects that are static within the system, and objects that are defined by the user. For example, the hierarchy interface 404 depicts four objects that are predefined by the system, a "PRIMARY TRICARE APC" object, a "Results" object, a "Temperatures" object, and an "Encounter" object. The "Additional Patient Detail" object reflects an extension to the "encounter" object defined by a user.

The database hierarchy 404 may include table extensions and independent objects as described above with respect to FIGS. 2-3, and these relationships may be represented in the hierarchy 404. For example, the hierarchy may reflect the relationships between data objects by starting with the selected category value (e.g., a particular encounter, in the present example), and identifying key-pair relationships between different data fields. For example, in the present example, an "Addition Patient Detail" extension has been defined for the encounter category. This extension further includes employer name, discharge status, and a reference to a member 2013 field. The member 2013 field is a reference to a member object, which itself includes icons for "Member ID", "Gender", "Payor", "Date of birth", and a set of extended data. The set of extended data is an extension to the member 2013 field, which itself includes data fields for a month, actual premium, contract premium, and status. The status field includes lookup values for a code field and a name field.

In the present example, dark arrows, such as the "Gender", "Payor", and "Extended Data" icons may refer to data objects (e.g., data tables or data table extensions represented as tables within the database), while white arrows such as "Member ID" or "Date of Birth" may indicate fields that may be requested by a user, such that the user is provided with data for that field as associated with the selected category (e.g., a Member ID for a member associated with a particular encounter, based on the fact that "Encounter" is selected from the category menu 402). It should be noted that while the "Status" icon is a white arrow in the present illustration, this display is an artifact of the fact that the data object has been highlighted, and absent the highlighted display this icon would normally be a dark arrow due to the fact that the "Status" icon is associated with an extension of the Member Month 2013 object.

The hierarchy 404 may allow the user to select particular fields for output. For example, the user may highlight a field (e.g., associated with a white arrow) within the hierarchy and a data request may be generated for those fields, such as a request as described with respect to FIGS. 2 and 3. Upon selection of these fields and confirming the selection, the query may be executed and the results provided, such as via a spreadsheet or other display application. In some embodiments, value filters may also be provided on the results (e.g., only displaying result data that conforms to particular values, such as only displaying results with "Paid" in a "Status Code" field).

In some embodiments, elements of the hierarchy may be present in more than one category. For example, in the present instance, the "Member 2013" field of the encounter category may be an independent object in addition to being referenced by the "Encounter" category. As such, selection of the "independent objects" category may display each of the independent objects defined for the database, with each independent object presented at the top of the hierarchy (e.g., the independent objects presented at the far left of the hierarchy view 404), even though certain other categories may reference the independent object.

Figure 5:
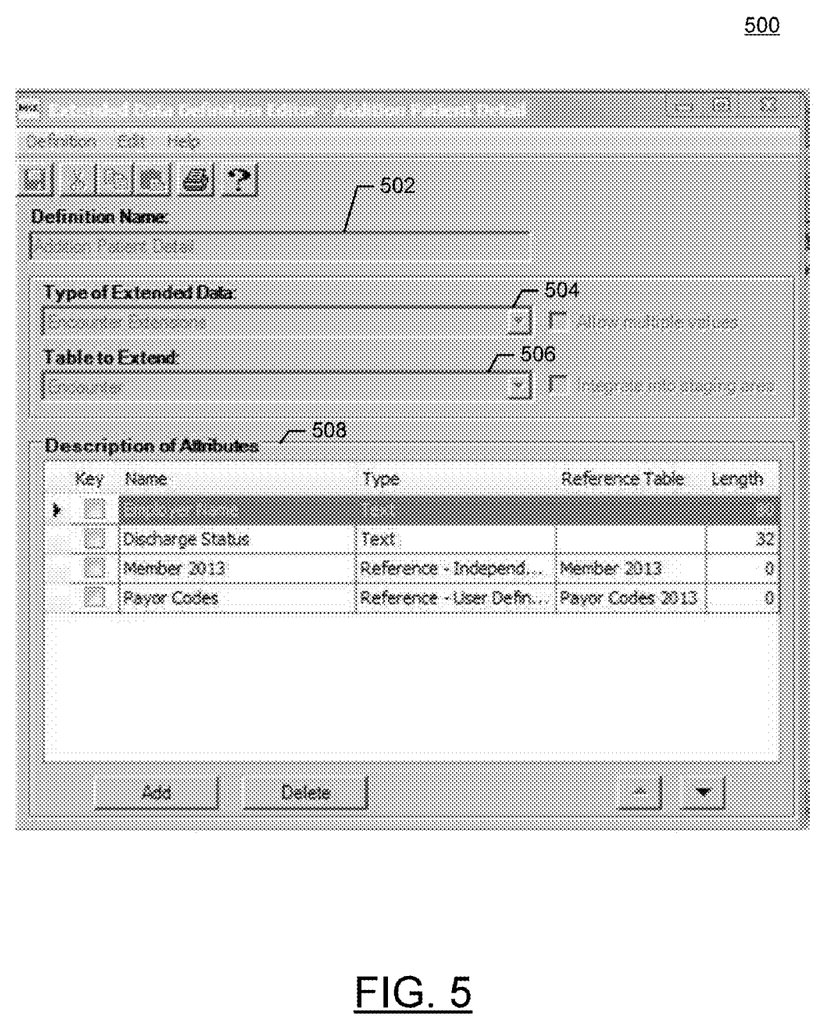
FIG. 5 is an illustration of an example of an interface for defining elements of a data object in accordance with some example embodiments of the present invention.

FIG. 5 is an illustration of an example of an interface 500 for defining a data object in accordance with some example embodiments of the present invention. As described above with respect to FIGS. 1-4, embodiments of the invention provide for the ability to dynamically define new objects for use in a database system. The interface 500 describes an application interface by which a user may select new data fields to create a new object or to extend an existing object. For example, the interface 500 may include a name entry field 502 for entry of a new object or extension name. The interface 500 may further include an object type field 504, for entry of a type of object (e.g., independent object or extension). Upon selection of an extension type, the interface 500 may also enable a table extension field 506, to allow the user to select a table to which the extended data should apply (e.g., to select to which table the extended data should emulate the addition of extra columns). The interface 500 may also include an attribute interface 508 to allow the user to specify attributes for the data types of the object.

In the present example interface 500, four data types have been created for a table extension. These data types include an employer name, a discharge status, a member 2013 reference, and a payor code lookup. The employer name and discharge status have been designated as text fields, and as such require no information to describe how they are referenced in another table. These fields are merely direct references to the text data related to the employer name and discharge status. The member 2013 reference is a reference to an independent object, such as the member object described above with respect to FIGS. 2-4. The interface 500 allows for the user to specify the type of value (e.g., a reference value to an independent object), and a table containing the reference (e.g., the member 2013 object). The payor codes may be user-defined lookup tables, and reference the payor code 2013 table, accordingly. The type of references defined in the attribute interface 508 may cause definition of the limits for a particular data object. For example, as described with respect to FIGS. 2 and 3, a reference to a lookup table requires a different order of limits and resulting query than a reference to an independent object. As such, embodiments of the invention may provide for creation of these limits according to the user specifications provided in an interface such as the interface 500. These limits may be created or modified as new objects and data fields are created and modified using an interface such as the interface 500.

Figure 6:
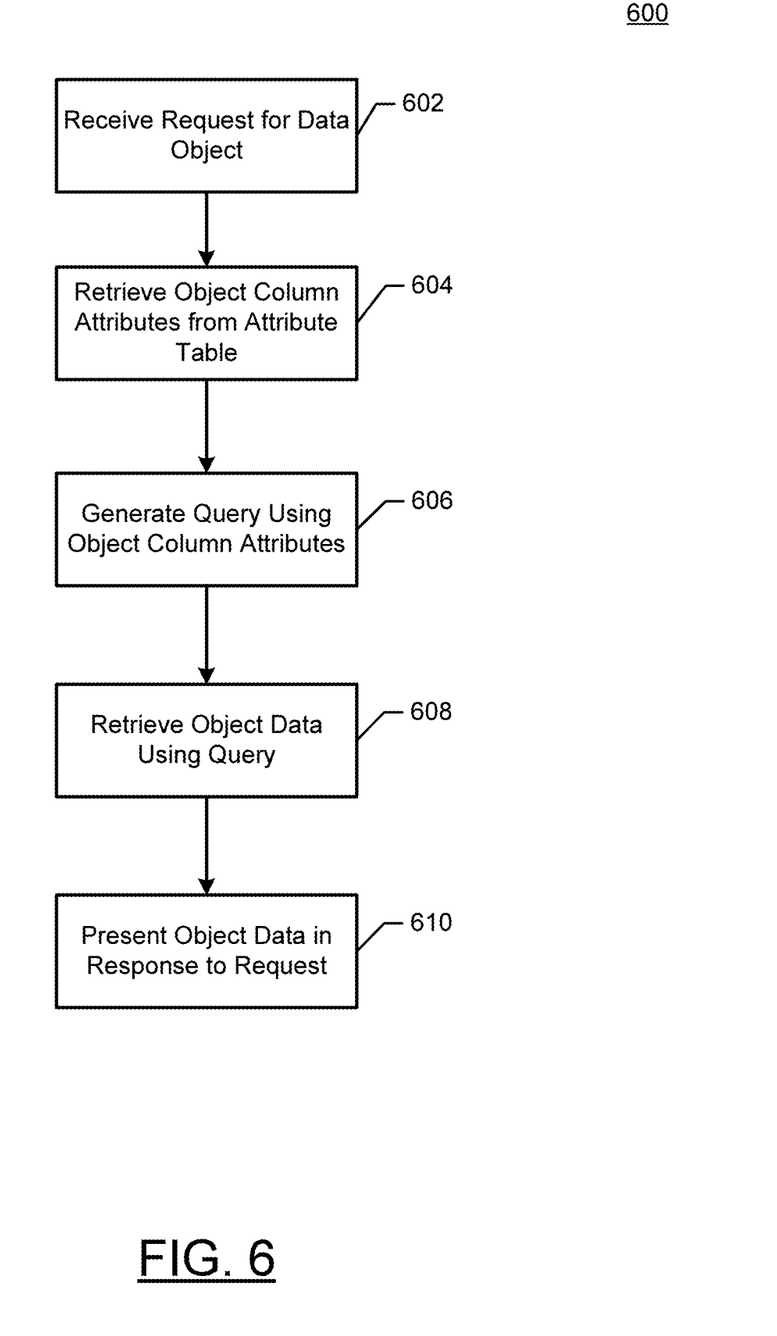
FIG. 6 is a flow diagram depicting an example of a method for accessing data in accordance with some example embodiments of the present invention.

FIG. 6 is a flow diagram depicting an example of a method 600 for accessing a data object in accordance with some example embodiments of the present invention. The method 600 illustrates a process for returning data in response to a request, such as described above with respect to FIGS. 2 and 3. Since some embodiments of the invention implement a flexible database schema, accessing data provided according to this flexible schema may include determining attribute data for the object and generating a query using the attribute data. The data returned in response to the query may be provided in response to the request. The method 600 may be performed, for example, by a query engine, such as the query engine 204 described with respect to FIG. 2, or another application executing on an apparatus, such as the apparatus 102 described with respect to FIG. 1.

At action 602, a request is received for data. For example, the data request may request a particular set of data stored in a database. In order to provide the data, the method may need to determine the relationships between different data objects within the database, such as by joining together multiple database tables as described above with respect to FIGS. 2 and 3. The query engine may obtain the necessary data to perform this query by accessing an attribute table that contains metadata describing the different data tables and columns of the database (e.g., the data table 300 described with respect to FIG. 3). The requested set of data may be associated with a particular entry (e.g., a particular row) stored within the attribute table. The query engine may contain data to map particular data requests to this entry.

At action 604, the request is used to obtain attribute data associated with the requested data from the attribute table. As described above, the attribute table may include data indicating the relationships between the various columns of tables within a database. For example, the attributes may include limits that identify a path through the database, as described above with respect to FIGS. 2 and 3. In some embodiments, data elements within a row of the attribute table reference a different database location (e.g., another row of the attribute table) that includes information that can be used to derive a query.

At action 606, the attributes are used to generate a query. As described with respect to FIGS. 2 and 3, the query may traverse the path through the database identified by the object attributes to obtain the requested data. For example, the query may be a SQL select or join query that includes references to the path defined by the object attributes.

At action 608, the query is executed to obtain the requested data. The results of the query may be provided as a database table and presented to the user, stored as a spreadsheet, printed as a document, or provided in any other format suitable for providing a response to the user request. At action 610, the results are provided as a response to the query.

Figure 7:
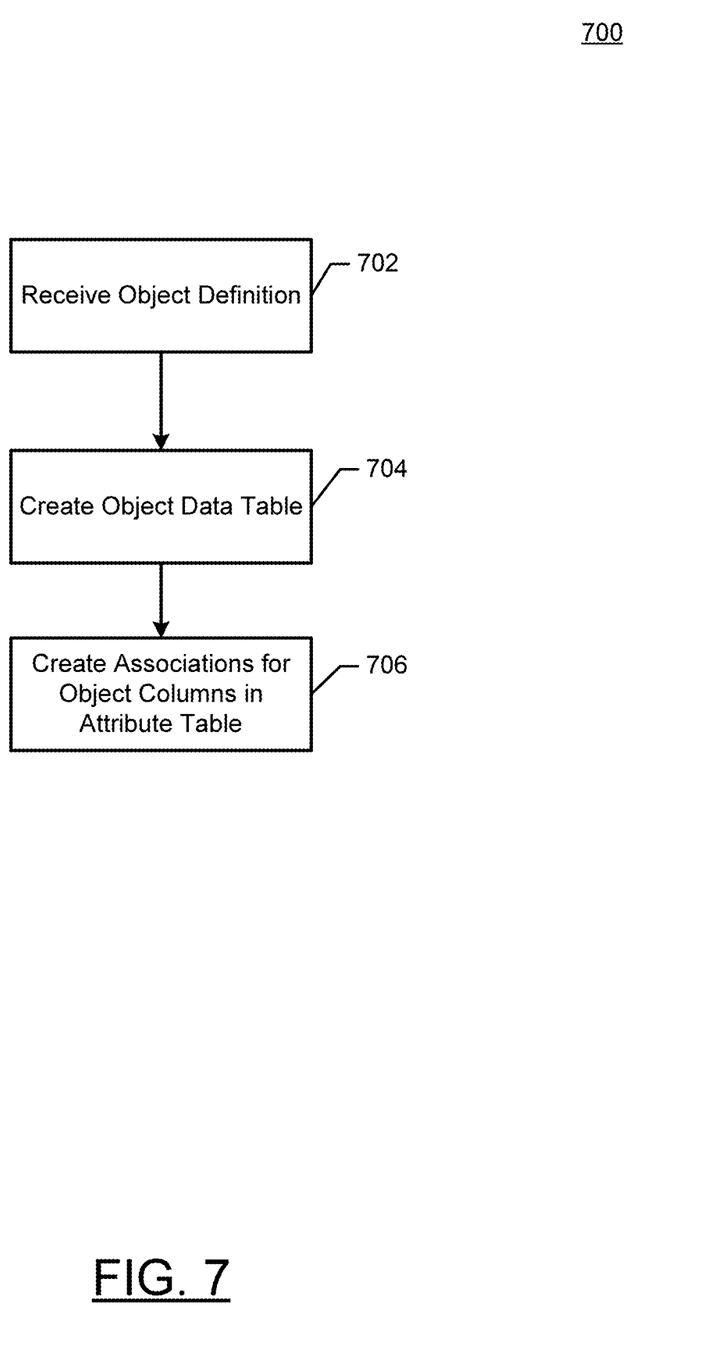
FIG. 7 is a flow diagram depicting an example of a method for providing a data definition for one or more data objects in accordance with some example embodiments of the present invention.

FIG. 7 is a flow diagram depicting an example of a method 700 for defining a data object in accordance with some example embodiments of the present invention. As described above, embodiments of the invention may provide the ability to dynamically create and modify objects within a database using a flexible database schema. The method 700 describes one method for definition of such an object or object extension within the database. As with the method 600, the method 700 may be performed, for example, by a query engine, such as the query engine 204 described with respect to FIG. 2, or another application executing on an apparatus, such as the apparatus 102 described with respect to FIG. 1.

At action 702, an object definition is received. For example, a user may wish to extend an existing table or create a new independent object, such as via the interface 500 described with respect to FIG. 5. The object definition may include a type of object (e.g., extension, independent object, or lookup table), data types for one or more columns of the object, and data indicating the references for the columns of the object.

At action 704, one or more data tables may be created for the object. For example, objects that include new values not present in the database may require new data tables to be created to store these data values. These data tables may be populated such as by a user specifying a data source (e.g., a spreadsheet or other file) for importing the data. Additionally or alternatively, data tables may be created to determine data table references, and populated with data at a later time.

At action 706, an attribute table containing attributes of objects within the database is updated to reflect the new object. In some embodiments, this may include creating new entries within the attribute table for new columns created for the object. Updating of the attribute table may also include populating the attribute table with the limits used to traverse the database to obtain the data included in the columns. For example, column fields that include references to other data tables or objects may include limits that allow for traversal of these data tables to obtain the information for populating the data object. By creating entries within the attribute table when creating the object, the method 700 may facilitate later lookups and data requests for data contained within the object by virtue of the fact that the object metadata is available to the query engine. Once the attribute table is populated, the object may be referenced as described above with respect to FIGS. 2-6.

It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 114 of an apparatus employing an embodiment of the present invention and executed by a processor 112 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
providing an interface having a plurality of interface controls;
receiving, via a first interface control of the plurality of interface controls, a selection of a first data object of a relational database;
updating, in response to the selection of the first data object, at least a second interface control of the plurality of interface controls to display a dependency relationship between the first data object and at least one of a second data object or a third data object, such that the dependency relationship depicts at least one key-pair relationship between the first data object and the at least one of the second data object or the third data object;
receiving, via a third interface control of the plurality of interface controls, a selection of a field of at least one data object displayed within the second interface control, wherein the selected field is displayed for selection based upon the displayed dependency relationship;
generating a request for a set of data stored in the relational database based on the selected field;
determining a first entry in at least one attribute table associated with the set of data, wherein the first entry comprises at least one reference to at least one additional entry within the at least one attribute table, where the first entry is associated with a column of a first data table of the relational database and the additional entry is associated with a column of a second data table of the relational database, different from the first table;
retrieving, using a processor and the first entry and in response to the request, three or more attributes for the set of data from the at least one attribute table, the three or more attributes providing at least a portion of a query for obtaining the set of data, wherein each attribute identifies at least one data object to be joined by the query to obtain the set of data, wherein a first attribute of the three or more attributes indicates the first data object, a second attribute of the three or more attributes indicates the second data object, and a third attribute of the three or more attributes indicates the third data object, wherein the first data object is not dependent upon any data objects, wherein the second data object references the first data object but does not depend on the first data object, and wherein the third data object references the first data object and depends on the first data object;
generating the query using the three or more attributes; and
executing the query to obtain, via data transferred through a network, the set of data from one or more data tables within the relational database that are distinct from the at least one attribute table.

2. The method of claim 1, further comprising providing the retrieved data to a remote computer that generated the request.

3. The method of claim 1, wherein the at least one attribute table comprises a plurality of rows, and wherein the first entry is associated with at least one column of a first data table of the relational database.

4. The method of claim 1, wherein the first entry corresponds to a row of the at least one attribute table.

5. The method of claim 1, wherein the query is at least one of a join query or a select query.

6. The method of claim 1, further comprising providing an interface to define a data object comprising at least a portion of the set of data.

7. The method of claim 1, wherein each entry within the at least one attribute table comprises data indicating a data table name and a data table column associated with each particular entry.

8. An apparatus comprising at least one processor and a memory, the memory comprising instructions that, when executed by the processor, configure the apparatus to:
provide an interface having a plurality of interface controls;
receive, via a first interface control of the plurality of interface controls, a selection of a first data object of a relational database;
update, in response to the selection of the first data object, at least a second interface control of the plurality of interface controls to display a dependency relationship between the first data object and at least one of a second data object or a third data object such that the dependency relationship depicts at least one key-pair relationship between the first data object and the at least one of the second data object or the third data object;
receive, via a third interface control of the plurality of interface controls, a selection of a field of at least one data object displayed within the second interface control, wherein the selected field is displayed for selection based upon the displayed dependency relationship;
generate a request for a set of data stored in a relational database;
determine a first entry in at least one attribute table associated with the set of data, wherein the first entry comprises at least one reference to at least one additional entry within the at least one attribute table, where the first entry is associated with a column of a first data table of the relational database and the additional entry is associated with a column of a second data table of the relational database, different from the first table;
retrieve, using the first entry and in response to the request, three or more attributes for the set of data from the at least one attribute table, the three or more attributes providing at least a portion of a query for obtaining the set of data, wherein each attribute identifies at least one data object to be joined by the query to obtain the set of data, wherein a first attribute of the three or more attributes indicates the first data object, a second attribute of the three or more attributes indicates the second data object, and a third attribute of the three or more attributes indicates the third data object, wherein the first data object is not dependent upon any data objects, wherein the second data object references the first data object but does not depend upon the first data object, and wherein the third data object references the first data object and depends upon the first data object;
generate the query using the three or more attributes; and execute the query to obtain, via data transferred through a network, the set of data from one or more data tables within the relational database that are distinct from the at least one attribute table.

9. The apparatus of claim 8, wherein the apparatus is further configured to provide the retrieved data to a remote computer that generated the request.

10. The apparatus of claim 8, wherein the at least one attribute table comprises a plurality of rows, and wherein the first entry is associated with at least one column of a first data table of the relational database.

11. The apparatus of claim 8, wherein the first entry corresponds to a row of the at least one attribute table.

12. The apparatus of claim 8, wherein the query is at least one of a join query or a select query.

13. The apparatus of claim 8, wherein the apparatus is further configured to provide an interface to define a data object comprising at least a portion of the set of data.

14. A non-transitory computer readable storage medium comprising instructions that, when executed by a processor, cause the processor to configure an apparatus to:
provide an interface having a plurality of interface controls;
receive, via a first interface control of the plurality of interface controls, a selection of a first data object of a relational database;
update, in response to the selection of the first data object, at least a second interface control of the plurality of interface controls to display a dependency relationship between the first data object and at least one of a second data object or a third data object, such that the dependency relationship depicts at least one key-pair relationship between the first data object and the at least one of the second data object or the third data object;
receive, via a third interface control of the plurality of interface controls, a selection of a field of at least one data object displayed within the second interface control, wherein the selected field is displayed for selection based upon the displayed dependency relationship;
generate a request for a set of data stored in a relational database;
determine a first entry in at least one attribute table associated with the set of data, wherein the first entry comprises at least one reference to at least one additional entry within the at least one attribute table, where the first entry is associated with a column of a first data table of the relational database and the additional entry is associated with a column of a second data table of the relational database, different from the first table;
retrieve, using the first entry and in response to the request, three or more attributes for the set of data from the at least one attribute table, the three or more attributes providing at least a portion of a query for obtaining the set of data, wherein each attribute identifies at least one data object to be joined by the query to obtain the set of data, wherein a first attribute of the three or more attributes indicates the first data object, a second attribute of the three or more attributes indicates the second data object, and a third attribute of the three or more attributes indicates the third data object, wherein the first data object is not dependent upon any data objects, wherein the second data object references the first data object but does not depend upon the first data object, and wherein the third data object references the first data object and depends upon the first data object;
generate the query using the three or more attributes; and
execute the query to obtain, via data transferred through a network, the set of data from one or more data tables within the relational database that are distinct from the at least one attribute table.

\* \* \* \* \*